US009527743B2

(12) United States Patent
Hintermann et al.

(10) Patent No.: US 9,527,743 B2
(45) Date of Patent: Dec. 27, 2016

(54) PROCESS FOR PREPARING GRAPHENE NANORIBBONS

(71) Applicants: BASF SE, Ludwigshafen (DE); EMPA—Eidgenossische Materialprufungs- und Forschungsanstalt, Duebendorf (CH)

(72) Inventors: Tobias Hintermann, Therwil (CH); Roman Fasel, Zuerich (CH); Pascal Ruffieux, Plassalb (CH); Jinming Cai, Zuerich (CH); Juan Ramon Sanchez Valencia, Malaga (ES)

(73) Assignees: BASF SE, Ludwigshafen (DE); EMPA—Eidgenössische Materialprüfungs-und Forschungsanstalt, Dübendorf (CH)

( * ) Notice: Subject to any disclaimer, the term of this patent is extended or adjusted under 35 U.S.C. 154(b) by 0 days.

(21) Appl. No.: 14/428,488

(22) PCT Filed: Sep. 4, 2013

(86) PCT No.: PCT/IB2013/058275
§ 371 (c)(1),
(2) Date: Mar. 16, 2015

(87) PCT Pub. No.: WO2014/045148
PCT Pub. Date: Mar. 27, 2014

(65) Prior Publication Data
US 2015/0225244 A1    Aug. 13, 2015

Related U.S. Application Data

(60) Provisional application No. 61/703,301, filed on Sep. 20, 2012.

(30) Foreign Application Priority Data

Sep. 20, 2012  (EP) .................................... 12185255

(51) Int. Cl.
C01B 31/04 (2006.01)
B82Y 30/00 (2011.01)
B82Y 40/00 (2011.01)

(52) U.S. Cl.
CPC ............ *C01B 31/0446* (2013.01); *B82Y 30/00* (2013.01); *B82Y 40/00* (2013.01); *C01B 31/0438* (2013.01); *C01B 2204/06* (2013.01)

(58) Field of Classification Search
CPC ..... B82Y 30/00; B82Y 40/00; C01B 31/0438; C01B 31/0446; C01B 2204/06
(Continued)

(56) References Cited

U.S. PATENT DOCUMENTS 7,968,872 B2    6/2011  Schaefer et al.
2010/0047154 A1  2/2010  Lee et al.
(Continued)

FOREIGN PATENT DOCUMENTS

CN          101913599 A    12/2010
WO    WO 2011/018144       2/2011
(Continued)

OTHER PUBLICATIONS

International Search Report issued Jan. 23, 2014 in PCT/IB2013/058275 Filed Sep. 4, 2013.
(Continued)

*Primary Examiner* — Daniel C McCracken
(74) *Attorney, Agent, or Firm* — Oblon, McClelland, Maier & Neustadt, L.L.P.

(57) ABSTRACT

The present invention relates to a process for preparing a graphene nanoribbon, which comprises: (a) providing at least one aromatic monomer compound which is selected from at least one polycyclic aromatic monomer compound, at least one oligo phenylene aromatic monomer compound, or combinations thereof, on a solid substrate, (b) polymer-
(Continued)

ization of the aromatic monomer compound so as to form at least one polymer on the surface of the solid substrate, (c) at least partially cyclodehydrogenating the one or more polymers of step (b), wherein at least step (b) is carried out at a total pressure p(total) of at least $1 \times 10^{-9}$ mbar; and a partial oxygen pressure $p(O_2)$ and partial water pressure $p(H_2O)$ which satisfy the following relation: $p(O_2) \times p(H_2O) < 3 \times 10^{-14}$ mbar$^2$.

14 Claims, 5 Drawing Sheets

(58) Field of Classification Search
USPC .......................................................... 423/448
See application file for complete search history.

(56) References Cited

U.S. PATENT DOCUMENTS

| | | | |
|---|---|---|---|
| 2010/0209330 A1* | 8/2010 | Golzhauser | B82Y 30/00 423/448 |
| 2011/0097258 A1 | 4/2011 | Lee et al. | |
| 2011/0244661 A1 | 10/2011 | Dai et al. | |
| 2012/0195821 A1 | 8/2012 | Sun et al. | |
| 2015/0126520 A1 | 5/2015 | Chiodo et al. | |

FOREIGN PATENT DOCUMENTS

WO  WO 2011/018144 A2  2/2011
WO  WO 2011/018144 A3  2/2011

OTHER PUBLICATIONS

Jinming Cai, et al., "Atomically precise bottom-up fabrication of graphene nanoribbons", Nature, vol. 466, Jul. 2010, pp. 470-473.
Extended Search Report issued Feb. 14, 2013 in European Patent Application No. 12185255.2.
Extended Search Report issued Jun. 14, 2016 in European Patent Application No. 13839100.8.
Stephan Blankenburg, et al., "Intraribbon Heterojunction Formation in Ultranarrow Graphene Nanoribbons", vol. 6, No. 3 Mar. 2012, XP055052320, pp. 2020-2025.
Lukas Dössel, et al., "Graphene Nanoribbons by Chemists: Nanometer-Sized, Soluble, and Defect-Free", Angewandte Chemie International Edition, vol. 50, No. 11, Jan. 2011, XP055022100, pp. 1433-7851.
Jishan WU, et al., "From Branched Polyphenylenes to Graphite Ribbons", Macromolecules 2003, 38, XP008138409, pp. 7082-7089.

* cited by examiner

Figures 10a) and 10b)

PROCESS FOR PREPARING GRAPHENE NANORIBBONS

CROSS REFERENCE TO RELATED APPLICATION

This application is a 371 of PCT/IB2013/058275, filed on Sep. 4, 2013, which is the non-provisional of U.S. Provisional Application 61/703,301, and claims priority to European Patent Application No. 12185255.2, filed on Sep. 20, 2012.

The present invention relates to a process for the preparation of graphene nanoribbons that can be performed under non-ultra-high vacuum conditions.

Graphene, an atomically thin layer from graphite, has received considerable interest in physics, material science and chemistry since the recent discovery of its appealing electronic properties. These involve superior charge carrier mobility and the quantum Hall effect. Moreover, its chemical robustness and material strength make graphene an ideal candidate for applications ranging from transparent conductive electrodes to devices for charge and energy storage.

Graphene nanoribbons (GNRs) are promising building blocks for novel graphene based electronic devices. Beyond the most important distinction between electrically conducting zig-zag edge (ZGNR) and predominantly semiconducting armchair edge ribbons (AGNR), more general variations of the geometry of a GNR allow for gap tuning through one-dimensional (1D) quantum confinement. In general, increasing the ribbon width leads to an overall decrease of the band gap, with superimposed oscillation features that are maximized for armchair GNRs (AGNRs).

The introduction of controlled defects into GNRs has the potential to further increase the versatility of these building blocks for use in electronic devices. Substitutional heteroatom functionalization of a carbon atom in the GNR plane is one possible approach for defect introduction. By selection of appropriate heteroatoms and substitution sites, GNR of identical dimensions can for instance be made into p- or n-type semiconductors.

Standard top-down fabrication techniques of GNR such as cutting graphene sheets e.g. using lithography, unzipping of carbon nanotubes (e.g. described in US2010/0047154 and US2011/0097258), or using nanowires as a template (e.g. described in KR2011/005436) are not suitable for ribbons narrower than 5-10 nm, because the edge configuration is not precisely controlled and they do not yield ribbons with a monodisperse width distribution. For high-efficiency electronic devices, the ribbons need to be smaller than 10 nm wide, their width needs to be precisely controlled and, importantly, their edges need to be smooth because even minute deviations from the ideal edge shapes seriously degrade the electronic properties.

Due to the inherent limitations of lithographic methods and of other known approaches to fabricate graphene nanostructures, however, the experimental realization of GNRs with the required high precision has remained elusive. Bottom-up approaches based on cyclodehydrogenation reactions in solution (e.g. Dossel, L.; Gherghel, L.; Feng, X.; Mullen, K. Angew. Chem. Int. Ed. 50, 2540-2543 (2011)) or on solid substrates (e.g. Cai, J.; et al. Nature 466, 470-473 (2010)) have recently emerged as promising routes to the synthesis of nanoribbons and nanographenes with precisely controlled structures.

At least two general types of precisely controlled linear nanoribbon structures can be distincted. In a first type, the edges are forming a straight line along the nanoribbon, while in another type, sometimes called 'chevron' type or 'graphitic nanowiggles' (described e.g. in Phys. Rev. Lett. 2011 (107), 135501), the edges are lying on a corrugated or saw-toothed line. The latter case can also be described as a periodic repetition of nonaligned graphitic nanoribbon domains seamlessly stitched together without structural defects.

The edges of the graphene nanoribbons may be substituted either with hydrogen atoms and/or with any other organic or inorganic groups.

In solution-based approaches starting from oligophenylene precursors, a polymer is typically prepared in a first step which is subsequently converted into the graphitic structure by Scholl-type oxidative cyclodehydrogenation. However, the design of the parent monomer must be carefully adjusted in order to guarantee for a suitable arrangement of the aromatic units upon the chemistry-assisted graphitization into the final GNR structure.

J. Wu, L. Gherghel, D. Watson, J. Li, Z. Wang, C. D. Simpson, U. Kolb, and K. Müllen, Macromolecules 2003, 36, 7082-7089 report the synthesis of graphitic nanoribbons obtained by intramolecular oxidative cyclodehydrogenation of soluble branched poly-phenylenes, which were prepared by repetitive Diels-Alder cycloaddition of 1,4-bis(2,4,5-triphenylcyclopentadienone-3-yl)benzene and diethynylterphenyl. The obtained graphene ribbons are not linear but rather contain statistically distributed "kinks" due to the structural design of the polyphenylene precursor.

Y. Fogel, L. Zhi, A. Rouhanipour, D. Andrienko, H. J. Räder, and K. Müllen, Macromolecules 2009, 42, 6878-6884 report the synthesis of a homologous series of five monodisperse ribbon-type polyphenylenes, with rigid dibenzopyrene cores in the repeat units, by microwave-assisted Diels-Alder reaction. The size of the obtained polyphenylene ribbons ranges from 132 to 372 carbon atoms in the aromatic backbone which incorporates up to six dibenzopyrene units. Because of the flexibility of the back-bone and the peripheral substitution with dodecyl chains, the polyphenylene ribbons are soluble in organic solvents. In a further reaction step, ribbon-type polycyclic aromatic hydrocarbons (PAHs) are prepared by cyclodehydrogenation.

All these solution based methods have so far only led to insoluble and hardly dispersible agglomerates of graphene nanoribbons which prevents processing of the graphene ribbons in the form of individual GNRs.

A surface-confined bottom-up approach to controlled graphene nanoribbons has been described in J. Cai et al., Nature 466, pp. 470-473 (2010) and in a small number of publications since then (S. Blankenburg et al., ACS Nano 2012, 6, 2020; S. Linden et al., Phys. Rev. Lett. 2012, 108, 216801). However, these graphenene nanoribbons were all prepared under ultra-high vacuum (UHV) conditions at pressures in the range of $10^{-10}$ mbar or below within a Scanning Tunneling Microscope apparatus. Such process conditions are not industrially relevant and do not allow commercial exploitation of the resulting graphene nanoribbon materials. Typically, ultra-high vacuum (UHV) is the vacuum regime characterized by pressures below $10^{-9}$ mbar.

It is an object of the present invention to provide a process for the preparation of graphene nanoribbons (GNR) under economically efficient (i.e. industrially relevant) conditions.

According to a first aspect of the present invention, the object is solved by a process for preparing graphene nanoribbons (GNRs), which comprises:
(a) providing at least one aromatic monomer compound which is selected from at least one polycyclic aromatic monomer compound, at least one oligo phenylene aromatic monomer compound, or combinations thereof, on a solid substrate,
(b) polymerization of the aromatic monomer compound so as to form at least one polymer on the surface of the solid substrate,
(c) at least partially cyclodehydrogenating the one or more polymers of step (b), wherein at least step (b) is carried out at
a total pressure p(total) of at least $1 \times 10^{-9}$ mbar; and
a partial oxygen pressure $p(O_2)$ and a partial water pressure $p(H_2O)$ which satisfy the following relation:

$$p(O_2) \times p(H_2O) \leq 3 \times 10^{-14} \text{ mbar}^2.$$

In a preferred embodiment of the first aspect, the process further comprises, prior to step (a), a substrate surface treatment step for providing a clean substrate surface, wherein the substrate surface treatment step is carried out at a total pressure p(total) of at least $1 \times 10^{-9}$ mbar.

According to a second aspect of the present invention, the object is solved by a process for preparing graphene nanoribbons (GNRs), which comprises:
(a) providing at least one aromatic monomer compound which is selected from at least one polycyclic aromatic monomer compound, at least one oligo phenylene aromatic monomer compound, or combinations thereof, on a solid substrate,
(b) polymerization of the aromatic monomer compound so as to form at least one polymer on the surface of the solid substrate,
(c) at least partially cyclodehydrogenating the one or more polymers of step (b); wherein
at least step (b) is carried out at a total pressure p(total) of at least $1 \times 10^{-9}$ mbar; and
a substrate surface treatment step is carried out prior to step (a) for providing a clean substrate surface, wherein the substrate surface treatment step is carried out at a total pressure p(total) of at least $1 \times 10^{-9}$ mbar.

In a preferred embodiment of the second aspect, at least step (b) is carried out at a partial oxygen pressure $p(O_2)$ and a partial water pressure $p(H_2O)$ which satisfy the following relation:

$$p(O_2) \times p(H_2O) \leq 3 \times 10^{-14} \text{ mbar}^2.$$

In the present invention, it has been surprisingly realized that graphene nanoribbons can still be obtained at non-ultra-high-vacuum conditions (i.e. total pressure of at least $1 \times 10^{-9}$ mbar) if a surface-assisted growth of graphene nanoribbons is carried out at partial pressures of oxygen and water as specified above, or if growth of graphene nanoribbons is effected on a surface which has been subjected to a cleaning step as specified above.

If not specifically indicated otherwise, the following statements apply to both the first and second aspect of the present invention.

The polycyclic aromatic monomer compound and/or the oligo phenylene aromatic monomer compound of step (a) can be any compound which undergoes polymerization to a polymer (preferably a linear polymer) under appropriate reaction conditions. Such polycyclic aromatic monomer or oligo phenylene aromatic monomer compounds that can be reacted to a polymer are generally known to the skilled person.

In the present invention, the term "polycyclic aromatic compound" is used according to its commonly accepted meaning and relates to aromatic compounds comprising at least two annelated or fused aromatic rings. According to a preferred embodiment, none of the annelated aromatic rings is a heterocyclic ring. However, it is also possible that at least one of the annelated aromatic rings comprises one or more heteroatoms, such as nitrogen, boron, phosphor and its oxides, oxygen, silicon, sulphur and its oxides, or any combination thereof.

In the present invention, the term "oligo phenylene aromatic compound" is used according to its commonly accepted meaning and preferably relates to a compound comprising the following unit:

-Ph-(Ph)$_a$-Phwherein
Ph is a divalent phenylene group, which can be substituted or unsubstituted, and a is an integer from 0 to 20, more preferably 0 to 10.

Substituted or unsubstituted polycyclic aromatic monomer compounds include e.g. naphthalene, anthracene, tetracene, pentacene, hexacene, heptacene, octacene, nonacene, phenanthrene, bisanthene, trisanthene, chrysene, pyrene, triphenylene, benzo[a]pyrene, perylene, coronene, all of which can be substituted or unsubstituted. Substituted or unsubstituted oligo phenylene aromatic monomer compounds include e.g. biphenyl, triphenyl (which is also referred to as terphenyl), tetraphenyl, pentaphenyl, hexaphenyl, heptaphenyl, octaphenyl, all of which can be substituted or unsubstituted.

Preferably, the polycyclic aromatic monomer and/or oligo phenylene aromatic monomer compound is substituted with at least two leaving groups, more preferably has at least two halogen substituents, preferably Br and/or I, which provide reactive sites for a subsequent polymerization reaction.

The polycyclic aromatic monomer compound can for instance be an anthracene based compound such as those of formulae 1-3 shown below, a bisanthene based compound such as the one of formula 4 shown below, or a trisanthene based compound such as the one of formula 5 shown below. A variety of such compounds is commercially available or can be prepared according to literature procedures by those skilled in the art.

In formulae 1 to 5, it is preferred that each X, independently from each other, is a leaving group, preferably Br or I;

each R, independently of each other, is hydrogen; linear or branched or cyclic $C_1$-$C_{12}$alkyl which is unsubstituted or substituted by one or more OH, $C_1$-$C_4$alkoxy, phenyl, or by CN; $C_2$-$C_{12}$alkyl which is interrupted by one or more non-consecutive O; halogen; OH; $OR_3$; $SR_3$; CN; $NO_2$; $NR_1R_2$; $(CO)R_3$; $(CO)OR_3$; $O(CO)OR_3$; $O(CO)NR_1R_2$; $O(CO)R_3$; $C_1$-$C_{12}$alkoxy; $C_1$-$C_{12}$alkylthio; $(C_1$-$C_6$alkyl)-$NR_7R_8$; or —O—$(C_1$-$C_6$alkyl)$NR_1R_2$; aryl or heteroaryl (wherein aryl is preferably phenyl, biphenyl, naphthyl, or anthryl all of which are unsubstituted or are substituted by one or more $C_1$-$C_4$-alkyl, CN, $OR_3$, $SR_3$, $CH_2OR_3$, (CO)$OR_3$, $(CO)NR_1R_2$ or halogen);

or two R together with the carbon atoms they are attached to form a 5-8-membered cycle or heterocycle;

$R_1$ and $R_2$ independently of each other are hydrogen, linear or branched $C_1$-$C_6$alkyl or phenyl, or $R_1$ and $R_2$ together with the nitrogen atom to which they are bonded form a group selected from $R_3$ is H, $C_1$-$C_{12}$alkyl, phenyl which is unsubstituted or is substituted by one or more $C_1$-$C_4$alkyl, phenyl, halogen, $C_1$-$C_4$alkoxy or $C_1$-$C_4$alkylthio.

The monomer compound can also be a pentacene based compound such as the compounds of formula 6 and 7. This type of compound can be prepared according to literature procedures by those skilled in the art.

X and R have the same meaning as defined above for formulae 1 to 5.

The monomer compound can also be a phenanthrene based compound such as the compounds of formulae 8 and 9. This type of monomer is described e.g. in U.S. Pat. No. 7,968,872.

8

9

X and R have the same meaning as defined above for formulae 1 to 5.

The monomer compound can also be an oligo phenylene aromatic hydrocarbon compound, such as described e.g. in patent applications EP 11 186 716.4 and EP 11 186 659.6, such as compounds 100 to 104 shown below.

100 wherein

X and R have the same meaning as defined above for formulae 1 to 5.

(I)

101

(II)

wherein

$R^1$, $R^2$, and $R^3$, which can be the same or different, are H, halogen, —OH, —NH$_2$, —CN, —NO$_2$, a linear or branched, saturated or unsaturated $C_1$-$C_{40}$ hydrocarbon residue (preferably $C_1$-$C_{20}$, more preferably $C_1$-$C_{10}$ or $C_1$-$C_4$) which can be substituted 1- to 5-fold with halogen (F, Cl, Br, I), —OH, —NH$_2$, —CN and/or —NO$_2$, and wherein one or more CH$_2$-groups can be replaced by —O—, —S—, —C(O)O—, —O—C(O)—, —C(O)—, —NH— or —NR—, wherein R is an optionally substituted $C_1$-$C_{40}$ (preferably $C_1$-$C_{20}$, more preferably $C_1$-$C_{10}$ or $C_1$-$C_4$) hydrocarbon residue, or an optionally substituted aryl, alkylaryl or alkoxyaryl residue, X is halogen.

wherein

$R^1$, $R^2$, and $R^3$, which can be the same or different, are H, halogen, —OH, —NH$_2$, —CN, —NO$_2$, a linear or branched, saturated or unsaturated $C_1$-$C_{40}$ (preferably $C_1$-$C_{20}$, more preferably $C_1$-$C_{10}$ or $C_1$-$C_4$) hydrocarbon residue, which can be substituted 1- to 5-fold with halogen (F, Cl, Br, I), —OH, —NH$_2$, —CN and/or —NO$_2$, and wherein one or more CH$_2$-groups can be replaced by —O—, —S—, —C(O)O—, —O—C(O)—, —C(O)—, —NH— or —NR—, wherein R is an optionally substituted $C_1$-$C_{40}$ (preferably $C_1$-$C_{20}$, more preferably $C_1$-$C_{10}$ or $C_1$-$C_4$) hydrocarbon residue, or an optionally substituted aryl, alkylaryl or alkoxyaryl residue, X is halogen and Y is H, or X is H and Y is halogen.

The monomer compound can also be a tetracene based compound such as those of formulae 10-13. This type of compound can be prepared according to literature procedures by those skilled in the art.

-continued wherein

X and R have the same meaning as defined above for formulae 1 to 5.

The monomer compound can also be a naphthalene based compound such as those of formulae 14 to 22. This type of compound can be prepared according to literature procedures by those skilled in the art.

-continued

20

21

22 wherein

X and R have the same meaning as defined above for formulae 1 to 5.

As mentioned above, the polycyclic aromatic monomer compound may comprises two or more annelated aromatic rings and at least one of the annelated aromatic rings comprises one or more heteroatoms such as nitrogen, boron, phosphor and its oxides, oxygen, silicon, sulphur and its oxides, or any combination thereof. With these aromatic monomer compounds, it is possible to introduce heteroatoms into the graphene structure.

For example, the aromatic monomer compound has one of the following formulas 23 to 25:

23

24

25 wherein
each X, independently from each other, is a leaving group, preferably Br or I;
Y is alkyl, aryl, or hydrogen; and
each R, independently of each other, is hydrogen; linear or branched or cyclic $C_1$-$C_{12}$alkyl which is unsubstituted or substituted by one or more OH, $C_1$-$C_4$alkoxy, phenyl, or by CN; $C_2$-$C_{12}$alkyl which is interrupted by one or more non-consecutive O; halogen; OH; $OR_3$; $SR_3$; CN; $NO_2$; $NR_1R_2$; $(CO)R_3$; $(CO)OR_3$; $O(CO)OR_3$; $O(CO)NR_1R_2$; $O(CO)R_3$; $C_1$-$C_{12}$alkoxy; $C_1$-$C_{12}$alkylthio; ($C_1$-$C_6$alkyl)-$NR_7R_8$; or —O—($C_1$-$C_6$alkyl)$NR_1R_2$; aryl or heteroaryl (wherein aryl is preferably phenyl, biphenyl, naphthyl, or anthryl all of which are unsubstituted or are substituted by one or more $C_1$-$C_4$-alkyl, CN, $OR_3$, $SR_3$, $CH_2OR_3$, (CO)$OR_3$, (CO)$NR_1R_2$ or halogen);
or two R together with the carbon atoms they are attached to form a 5-8-membered cycle or heterocycle;
$R_1$ and $R_2$ independently of each other are hydrogen, linear or branched $C_1$-$C_6$alkyl or phenyl, or $R_1$ and $R_2$ together with the nitrogen atom to which they are bonded form a group selected from $R_3$ is H, $C_1$-$C_{12}$alkyl, phenyl which is unsubstituted or is substituted by one or more $C_1$-$C_4$alkyl, phenyl, halogen, $C_1$-$C_4$alkoxy or $C_1$-$C_4$alkylthio.

In a preferred embodiment, the aromatic monomer compound is a polycyclic aromatic monomer compound comprising two or more annelated aromatic rings and at least one non-annelated heterocyclic residue being attached to at least one of the annelated aromatic rings. Alternatively, it can also be preferred that that the aromatic monomer compound is an oligo phenylene aromatic monomer compound which comprises at least one heterocyclic residue (either aromatic or non-aromatic) being attached to the phenylene group. As already mentioned above, the one or more heteroatoms or heteroatomic groups of the heterocyclic residue are preferably selected from nitrogen, boron, oxygen, sulphur and its oxides, phosphor and its oxides, or any combination thereof.

In a preferred embodiment, the aromatic monomer compound has the following formula 26:

26 wherein
each X, independently from each other, is a leaving group, preferably Br or I.

The type of monomer as exemplified by formula 26 can be prepared using a synthetic strategy as described e.g. in U.S. Pat. No. 7,968,872. The polycyclic aromatic monomer compound can for instance also be a Benzo[f]naphtho[2,1-c]cinnoline based compound such as a compound of formula 23 shown above and described by P. F. Holt and A. E. Smith in J. Chem. Soc., 1964, 6095, or a 8,8'-Biquinoline based compound such as a compound of formula 24 shown above and described in Tetrahedron Letters 53 (2012) 285-288, or a 1H-Phenanthro[1,10,9,8-cdefg]carbazole based compound such as a compound of formula 25 shown above and described in WO 2011/018144. A variety of such compounds is commercially available or can be prepared according to literature procedures by those skilled in the art.

As indicated above, step (a) includes providing the at least one polycyclic aromatic monomer or oligo phenylene aromatic monomer compound on a solid substrate.

Any solid substrate enabling the adsorption of the polycyclic aromatic monomer or oligo phenylene aromatic monomer compound and subsequent polymerization to a linear polymer on its surface can be used. Preferably, the solid substrate has a flat surface.

The flat surface on which the monomer compound is deposited can be a metal surface such as a Au, Ag, Cu, Al, W, Ni, Pt, or a Pd surface (which may be reconstructed or vicinal), more preferably Au and/or Ag. The surface can be completely flat or patterned or stepped. Such patterned or stepped surfaces and manufacturing methods thereof are known to the skilled person. On patterned surfaces the growth of graphene nanoribbons may be directed by the surface pattern.

The surface may also be a metal oxide surface such as silicon oxide, silicon oxynitride, hafnium silicate, nitrided hafnium silicates (HfSiON), zirconium silicate, hafnium dioxide and zirconium dioxide, or aluminium oxide, copper oxide, iron oxide.

The surface may also be made of a semiconducting material such as silicon, germanium, gallium arsenide, silicon carbide, and molybdenum disulfide.

The surface may also be a material such as boron nitride, sodium chloride, or calcite. The surface may be electrically conducting, semiconducting, or insulating.

The deposition on the surface may be done by any process suitable for providing organic compounds on a surface. The process can be e.g. a vacuum deposition (sublimation) process, a solution based process such as spin coating, spray coating, dip coating, printing, electrospray deposition, or a laser induced desorption or transfer process. The deposition process may also be a direct surface to surface transfer.

Preferably the deposition is done by a vacuum deposition process. Preferably it is a vacuum sublimation process.

As indicated above and will be discussed below in further detail, step (b) of the process according to the first aspect of the present invention is carried out at a total pressure p(total) of at least $1 \times 10^{-9}$ mbar; and a partial oxygen pressure $p(O_2)$ and partial water pressure $p(H_2O)$ which satisfy the following relation:

$p(O_2) \times p(H_2O) \leq 3 \times 10^{-14}$ mbar$^2$.

In the present invention (either according to the first aspect or the second aspect), it is not necessary to carry out step (a) under those conditions. However, in a preferred embodiment, step (a) is also carried out at a total pressure p(total) of at least $1 \times 10^{-9}$ mbar; and optionally a partial oxygen pressure $p(O_2)$ and partial water pressure $p(H_2O)$ which satisfy the following relation:

$p(O_2) \times p(H_2O) \leq 3 \times 10^{-14}$ mbar$^2$.

Preferably, the total pressure p(total) in step (a) is $1 \times 10^{-3}$ mbar or less.

In a preferred embodiment, the total pressure p(total) in step (a) is within the range of from $1 \times 10^{-9}$ mbar to $1 \times 10^{-3}$ mbar, more preferably from $1 \times 10^{-8}$ mbar to $1 \times 10^{-5}$ mbar.

As indicated above, step (b) of the process of the present invention includes polymerization of the polycyclic aromatic monomer and/or oligo phenylene aromatic monomer compound so as to form at least one polymer, which is preferably linear, on the surface of the solid substrate.

Appropriate conditions for effecting polymerization of the polycyclic aromatic monomer and/or oligo phenylene aromatic monomer compound are generally known to the skilled person.

Preferably, the polymerization in step (b) is induced by thermal activation. However, any other energy input which induces polymerization of the polycyclic aromatic monomer and/or oligo phenylene aromatic monomer compound such as radiation can be used as well.

The activation temperature is dependent on the employed surface and the monomer and can be in the range of from −200 to 500° C., e.g. 0-500° C.

Polymerization of the aromatic monomer compound can be effected e.g. by removal of the at least two leaving groups from the aromatic monomer compound (dehalogenation if the leaving groups are halogen such as Br and/or I), followed by covalently linking the aromatic monomer compounds via C—C coupling. This type of reaction is generally known to the skilled person.

Optionally, step (a) and/or step (b) can be repeated at least once before carrying out partial or complete cyclodehydrogenation in step (c). When repeating steps (a) and (b), the same monomer compound or a different polycyclic aromatic monomer and/or oligo phenylene aromatic monomer compound can be used.

As indicated above, step (b) according to the first aspect of the present invention is carried out at
a total pressure p(total) of at least $1 \times 10^{-9}$ mbar; and
a partial oxygen pressure $p(O_2)$ and a partial water pressure $p(H_2O)$ which satisfy the following relation:

$p(O_2) \times p(H_2O) \leq 3 \times 10^{-14}$ mbar$^2$.

The following applies to step (b) according to the first and second aspect of the present invention.

The total pressure can be measured by electronic vacuum gauges which are typically of the Pirani, thermocouple, cathode ionization gauge or thermistor type.

Means for lowering the partial oxygen pressure $p(O_2)$ and the partial water pressure $p(H_2O)$ are commonly known to the skilled person. Lowering the water partial pressure can be done by baking of the vacuum system. Oxygen and water partial pressures can be reduced by using a getter pump.

The partial oxygen pressure $p(O_2)$ and the partial water pressure $p(H_2O)$ is typically measured by a quadrupole mass spectrometer. This device ionizes the different gases and separates the ions according to their masses. Every gas molecule produces a characteristic signal at several defined masses with a certain ionization probability, whose intensity is proportional to the partial pressure.

Preferably, the total pressure p(total) in step (b) is $1 \times 10^{-3}$ mbar or less.

In a preferred embodiment, the total pressure p(total) in step (b) is within the range of from $1 \times 10^{-9}$ mbar to $1 \times 10^{-3}$ mbar, more preferably from $1 \times 10^{-8}$ mbar to $1 \times 10^{-5}$ mbar.

Preferably, in step (b) the partial oxygen pressure $p(O_2)$ and the partial water pressure $p(H_2O)$ satisfy the following relation:

$$p(O_2) \times p(H_2O) \leq 3 \times 10^{-15} \text{ mbar}^2.$$

In a preferred embodiment, in step (b) the partial oxygen pressure $p(O_2)$ and the partial water pressure $p(H_2O)$ satisfy the following relation:

$$2.5 \times 10^{-19} \text{ mbar}^2 \leq p(O_2) \times p(H_2O) \leq 3 \times 10^{-14} \text{ mbar}^2;$$

$$\text{more preferably } 2.5 \times 10^{-19} \text{ mbar}^2 \leq p(O_2) \times p(H_2O) \leq 3 \times 10^{-15} \text{ mbar}^2.$$

As indicated above, step (c) of the process of the present invention includes at least partially cyclodehydrogenating the one or more polymers of step (b).

In general, appropriate reaction conditions for cyclodehydrogenation are known to the skilled person.

In a preferred embodiment, the polymer of step (b) is subjected to complete cyclodehydrogenation.

In one embodiment, at least two different polycyclic aromatic monomer or oligo phenylene aromatic monomer compounds are provided on the solid substrate in step (a).

According to this embodiment, two or more different monomer compounds, preferably having similar reactivity, are provided on the surface of the solid substrate, followed by inducing polymerization to form a co-polymer, preferably a linear co-polymer. Subsequently, a partial or complete cyclodehydrogenation reaction is carried out leading to a segmented graphene nanoribbon.

In a variation of this embodiment, a first polycyclic aromatic monomer or oligo phenylene aromatic monomer compound is deposited on the surface of the solid substrate, followed by inducing polymerization to form a polymer, preferably a linear polymer. A second monomer is then deposited on the same substrate surface, followed by inducing polymerization to form a block co-polymer, preferably a linear block co-polymer. This step may optionally be repeated several times, either with identical or different monomer compounds to yield a multi block copolymer. Subsequently, the block co-polymer is subjected to a partial or complete cyclodehydrogenation reaction leading to a segmented graphene nanoribbon.

In another embodiment, the partial or complete cyclodehydrogenation reaction is induced by a spatially controlled external stimulus.

The external stimulus may be an electrical current, heat, an ion beam, oxidative plasma, microwave, light or electromagnetic radiation in general or it may be an oxidative chemical reagent. The spatial control of the activation may be done using a highly focused activation stimulus whose position versus the substrate can be controlled. The spatially confined activation stimulus may originate from a nano sized electrode, such as e.g. a tip of a tunneling microscope or from highly focused electromagnetic radiation such as e.g. a focused laser beam, or from a highly focused electron beam such as in an electron microscope. The spatial control of the activation may also be done using a nanostructured mask to direct the impact of the activation stimulus, such as e.g. a photomask.

Preferably, step (c) is carried out at a total pressure p(total) of at least $1 \times 10^{-9}$ mbar; and optionally a partial oxygen pressure $p(O_2)$ and a partial water pressure $p(H_2O)$ which satisfy the following relation:

$$p(O_2) \times p(H_2O) \leq 3 \times 10^{-14} \text{ mbar}^2.$$

Preferably, the total pressure p(total) in step (c) is $1 \times 10^{-3}$ mbar or less.

In a preferred embodiment, the total pressure p(total) in step (c) is within the range of from $1 \times 10^{-9}$ mbar to $1 \times 10^{-3}$ mbar, more preferably from $1 \times 10^{-8}$ mbar to $1 \times 10^{-5}$ mbar.

Preferably, in step (c) the partial oxygen pressure $p(O_2)$ and the partial water pressure $p(H_2O)$ satisfy the following relation:

$$p(O_2) \times p(H_2O) \leq 3 \times 10^{-15} \text{ mbar}^2.$$

In a preferred embodiment, in step (c) the partial oxygen pressure $p(O_2)$ and the partial water pressure $p(H_2O)$ satisfy the following relation:

$$2.5 \times 10^{-19} \text{ mbar}^2 \leq p(O_2) \times p(H_2O) \leq 3 \times 10^{-14} \text{ mbar}^2;$$

$$\text{more preferably } 2.5 \times 10^{-19} \text{ mbar}^2 \leq p(O_2) \times p(H_2O) \leq 3 \times 10^{-15} \text{ mbar}^2.$$

According to the second aspect of the present invention, the process comprises a substrate surface treatment step prior to step (a) for providing a clean substrate surface. According to the first aspect of the present invention, this substrate surface treatment step is optional.

Appropriate methods for obtaining a clean surface of the solid substrate are commonly known to the skilled person. Preferably, the clean surface can be obtained by e.g. ion sputtering, plasma cleaning, and/or thermal annealing (preferably under controlled and/or inert atmosphere), or any combination thereof. Depending on the type of substrate, the annealing temperature can be varied over a broad range, e.g. from 200° C. to 1200° C. The clean substrate surface can also be obtained by deposition of a thin layer of the substrate surface material or by cleavage of the substrate, possibly in combination with one or more of the above-mentioned surface treatment steps.

If carried out, the total pressure p(total) used for the surface treatment step prior to step (a) is at least $1 \times 10^{-9}$ mbar, more preferably at least $1 \times 10^{-8}$ mbar.

Possible upper limits of the total pressure p(total) of the substrate surface treatment step are e.g. 10 bar, 1 bar, or $1 \times 10^{-3}$ mbar.

Typically, the process of the present invention (either according to the first aspect or the second aspect) is carried out in a closed device and the term "total pressure p(total)" relates to the total pressure within said closed device.

The process of the present invention can be carried out in any device, in particular closed device, which can be operated under those process conditions, in particular pressure conditions, described above. As an example, the process can be carried out in a vacuum chamber.

Preferably, process steps (a) to (c), and optionally the substrate surface treatment step, are carried out within a single device (e.g. a vacuum chamber or a single vacuum process system) which is operated under those pressure conditions as specified above.

Preferably, the process does not comprise any intermediate steps in between the substrate surface treatment step and step (a), thereby avoiding any contamination of the substrate surface prior to step (a) as surface contamination might have a detrimental impact on the surface-assisted growth of graphene nanoribbons.

In the present invention, it is also possible that there are no intermediate steps in between the process steps (a) to (c). The process steps (a) to (c) can directly succeed each other and/or overlap, with no intermediate steps in between. Just as an example, it is possible that the aromatic monomer compounds are provided on the solid substrate under conditions where polymerisation of these aromatic monomer compounds already proceeds.

According to a further aspect, the present invention provides graphene nanoribbons which are obtained or obtainable by the process as described above.

The process of the present invention will now be described in further detail by the following Examples.

EXAMPLES

Example 1

Under the controlled atmosphere of a vacuum chamber, nine samples were prepared at different pressure conditions.

Figure 1:
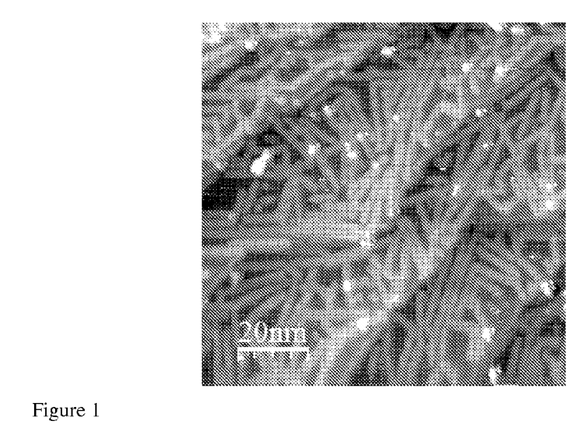
FIG. 1 shows a Scanning Tunneling Microscopy (STM) image of Sample 1 in Example 1.

FIG. 1 shows a Scanning Tunneling Microscopy (STM) image of Sample 1 in Example 1, deposited at a total pressure p(total)=$1.6 \times 10^{-8}$ mbar; and p($O_2$)×p($H_2O$)=$2.59 \times 10^{-19}$ mbar$^2$.

Figure 2:
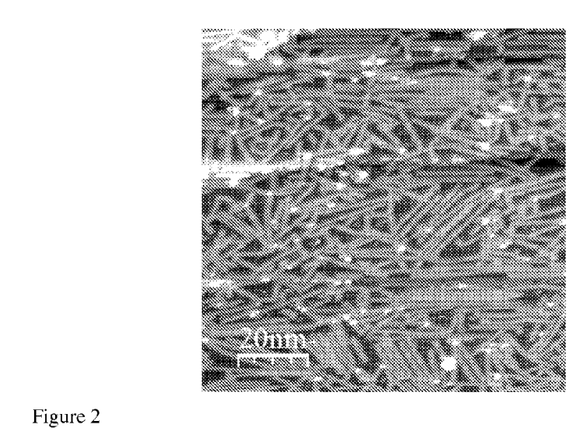
FIG. 2 shows a STM picture of Sample 2 in Example 1.

FIG. 2 shows a STM picture of Sample 2 in Example 1, deposited at a total pressure p(total)=$1.1 \times 10^{-7}$ mbar; and p($O_2$)×p($H_2O$)=$7.67 \times 10^{-20}$ mbar$^2$.

Figure 3:
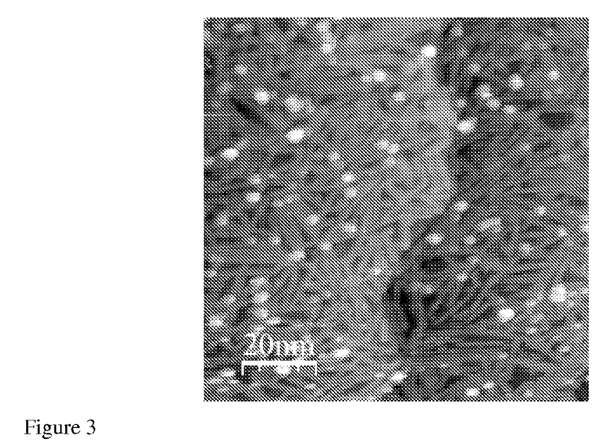
FIG. 3 shows a STM picture of Sample 3 in Example 1.

FIG. 3 shows a STM picture of Sample 3 in Example 1, deposited at a total pressure p(total)=$1.3 \times 10^{-7}$ mbar; and p($O_2$)×p($H_2O$)=$1.29 \times 10^{-17}$ mbar$^2$.

Figure 4:
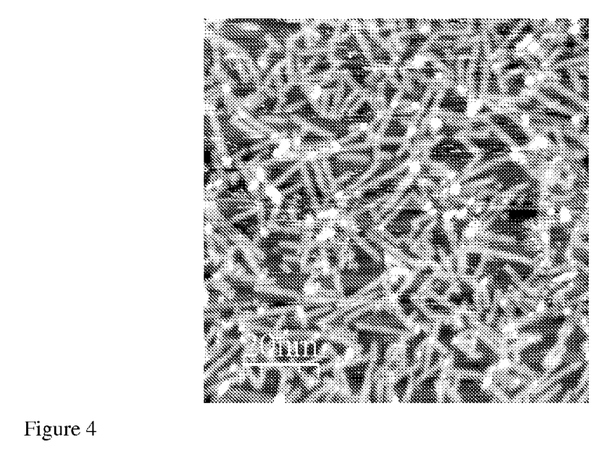
FIG. 4 shows a STM picture of Sample 4 in Example 1.

FIG. 4 shows a STM picture of Sample 4 in Example 1, deposited at a total pressure p(total)=$2.8 \times 10^{-7}$ mbar; and p($O_2$)×p($H_2O$)=$4.14 \times 10^{-16}$ mbar$^2$.

Figure 5:
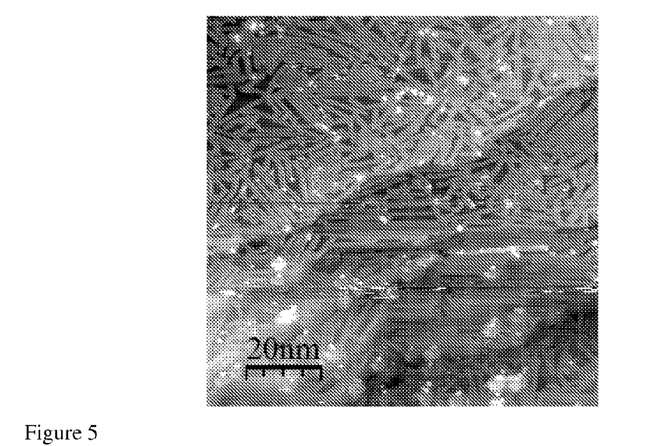
FIG. 5 shows a STM picture of Sample 5 in Example 1.

FIG. 5 shows a STM picture of Sample 5 in Example 1, deposited at a total pressure p(total)=$2.3 \times 10^{-6}$ mbar; and p($O_2$)×p($H_2O$)=$2.13 \times 10^{-15}$ mbar$^2$.

Figure 6:
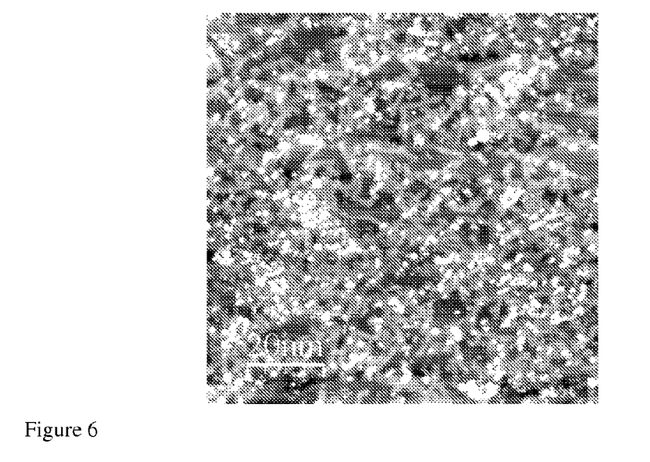
FIG. 6 shows a STM picture of Sample 6 in Example 1.

FIG. 6 shows a STM picture of Sample 6 in Example 1, deposited at a total pressure p(total)=$9.9 \times 10^{-7}$ mbar; and p($O_2$)×p($H_2O$)=$4.24 \times 10^{-15}$ mbar$^2$.

Figure 7:
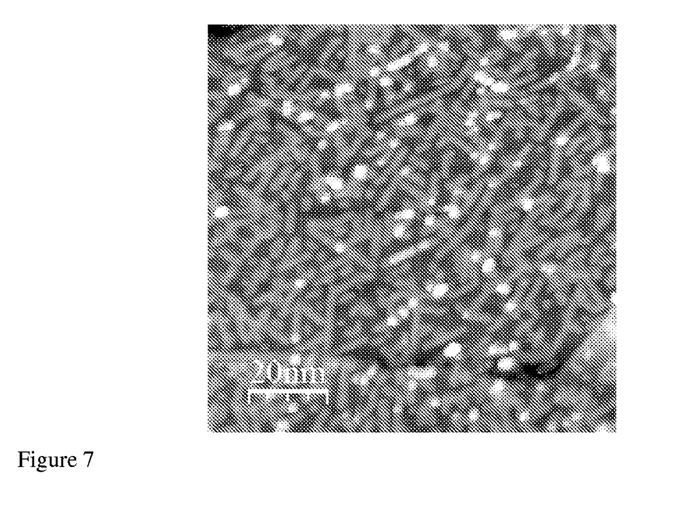
FIG. 7 shows a STM picture of Sample 7 in Example 1.

FIG. 7 shows a STM picture of Sample 7 in Example 1, deposited at a total pressure p(total)=$2.6 \times 10^{-6}$ mbar; and p($O_2$)×p($H_2O$)=$2.76 \times 10^{-14}$ mbar$^2$.

Figure 8:
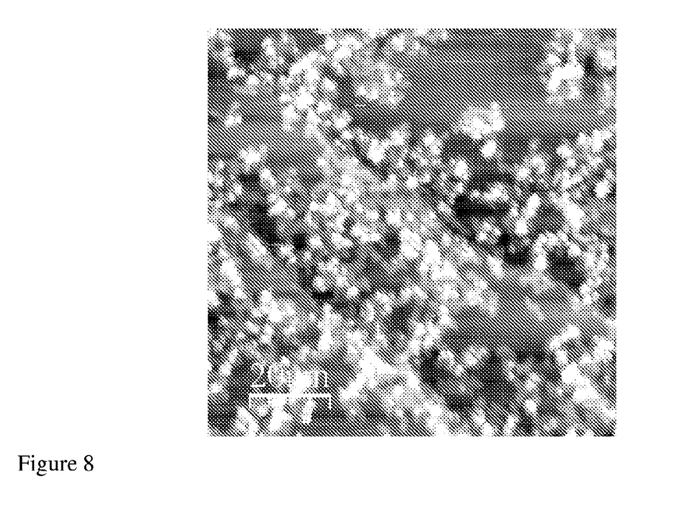
FIG. 8 shows a STM picture of Sample 8 in Example 1.

FIG. 8 shows a STM picture of Sample 8 in Example 1, deposited at a total pressure p(total)=$3.0 \times 10^{-6}$ mbar; and p($O_2$)×p($H_2O$)=$3.38 \times 10^{-14}$ mbar$^2$.

Figure 9:
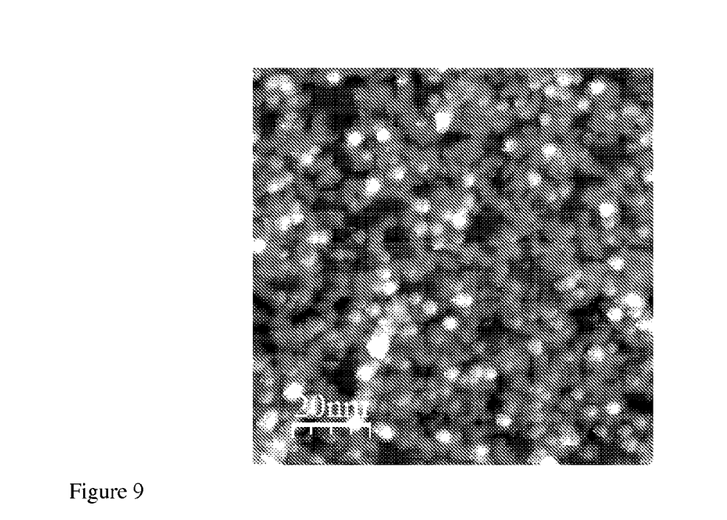
FIG. 9 shows a STM picture of Sample 9 in Example 1.

FIG. 9 shows a STM picture of Sample 9 in Example 1, deposited at a total pressure p(total)=$3.7 \times 10^{-6}$ mbar; and p($O_2$)×p($H_2O$)=$1.58 \times 10^{-13}$ mbar$^2$.

The pressure conditions used for preparing samples 1 to 9 and the type of product obtained are summarized below:

|  | p(total) [mbar] | p($O_2$) [mbar] | p($H_2O$) [mbar] | p($O_2$) × p($H_2O$) [mbar2] | Product obtained |
|---|---|---|---|---|---|
| Sample 1 | $1.6 \times 10^{-8}$ | $3.76 \times 10^{-11}$ | $6.91 \times 10^{-9}$ | $2.59 \times 10^{-19}$ | Ribbon structure |
| Sample 2 | $1.1 \times 10^{-7}$ | $2.74 \times 10^{-10}$ | $2.80 \times 10^{-10}$ | $7.67 \times 10^{-20}$ | Ribbon structure |
| Sample 3 | $1.3 \times 10^{-7}$ | $2.00 \times 10^{-10}$ | $6.45 \times 10^{-8}$ | $1.29 \times 10^{-17}$ | Ribbon structure |
| Sample 4 | $2.8 \times 10^{-7}$ | $2.19 \times 10^{-7}$ | $1.89 \times 10^{-9}$ | $4.14 \times 10^{-16}$ | Ribbon structure |
| Sample 5 | $2.3 \times 10^{-6}$ | $1.04 \times 10^{-9}$ | $2.05 \times 10^{-6}$ | $2.13 \times 10^{-15}$ | Ribbon structure |
| Sample 6 | $9.9 \times 10^{-7}$ | $8.99 \times 10^{-7}$ | $4.72 \times 10^{-9}$ | $4.24 \times 10^{-15}$ | Ribbon and dendritic structures |
| Sample 7 | $2.6 \times 10^{-6}$ | $1.26 \times 10^{-08}$ | $2.19 \times 10^{-6}$ | $2.76 \times 10^{-14}$ | Ribbon and dendritic structures |
| Sample 8 | $3.0 \times 10^{-6}$ | $2.89 \times 10^{-06}$ | $1.17 \times 10^{-8}$ | $3.38 \times 10^{-14}$ | Dendritic structures |
| Sample 9 | $3.7 \times 10^{-6}$ | $4.99 \times 10^{-08}$ | $3.17 \times 10^{-6}$ | $1.58 \times 10^{-13}$ | Dendritic structures |

The pressure conditions were accomplished by operating at reduced pumping power; or subsequently dosing water and/or oxygen into the vacuum chamber; or pumping after venting.

The aromatic monomer compound used in Example 1 was 10,10'-dibromo-9,9'-bianthryl.

The solid substrate was an Au(111) surface on mica.

The bianthryl precursor molecules were deposited on the Au(111) surface at 200° C. The bianthryl precursor molecules provided on the Au(111) surface were polymerized via dehalogenation and subsequent C—C coupling at 200° C.

Finally, cyclohydrogenation of the polymer was carried out at 400° C.

From each sample prepared in Example 1, an STM picture was taken.

The results are illustrated in FIGS. 1 to 9.

All samples were prepared at non-ultra-high-vacuum pressure conditions (pressure of at least $10^{-9}$ mbar). As can be seen from the Figures, graphene nanoribbons are obtained if the product p($H_2O$)×p($O_2$) does not exceed $3 \times 10^{-14}$ mbar$^2$. Within the range of $3 \times 10^{-15}$ mbar$^2$ < p($H_2O$)×p($O_2$) ≤ $3 \times 10^{-14}$ mbar$^2$, both ribbon growth and dendritic growth is observed, whereas only ribbon growth takes place if p($H_2O$)×p($O_2$) ≤ $3 \times 10^{-15}$ mbar$^2$.

Example 2

In Example 2, a sample was prepared in a vacuum chamber which was equipped with an ion source for cleaning the surface of the solid substrate.

The solid substrate (Au(111) surface on mica) was positioned in the vacuum chamber and cleaned via treatment with Ar$^+$ ions under high vacuum conditions (i.e. total gas phase pressure p(total) in chamber of about $3 \times 10^{-5}$ mbar. Just like in Example 1, the aromatic monomer compound used in Example 2 was 10,10'-dibromo-9,9'-bianthryl.

The bianthryl precursor molecules were deposited on the Au(111) surface at 200° C.

The bianthryl precursor molecules provided on the Au(111) surface were polymerized via dehalogenation and subsequent C—C coupling at 200° C.

Finally, cyclohydrogenation of the polymer was carried out at 400° C.

The steps of providing the precursor molecules on the solid substrate and subsequently growing the graphene nanoribbons on the solid substrate were carried out at a total gas phase pressure in the vacuum chamber of $2\times10^{-7}$ mbar.

From the sample prepared in Example 2, STM pictures were taken.

Figure 10A:
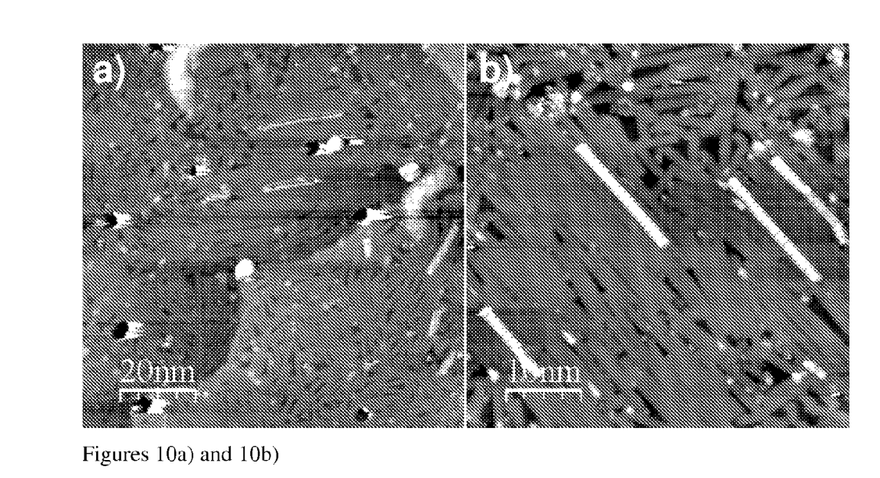
FIGS. 10a) and 10b) show STM pictures of the sample prepared in Example 2 at different magnifications of a sample deposited in the HV system at a pressure of $2 \times 10^{-7}$ mbar.

The results are illustrated in FIGS. 10 $a$) and $b$).

FIGS. 10$a$) and 10$b$) show STM pictures at different magnifications of a sample deposited in the HV system at a pressure of $2\times10^{-7}$ mbar.

As shown by FIGS. 10 $a$) and $b$), linear graphene nanoribbons of high quality can be obtained at non-ultra-high-vacuum conditions if the solid substrate is subjected to a cleaning step at high vacuum conditions prior to providing the aromatic monomer compound on the solid substrate and initiating growth of the graphene nanoribbons.

The invention claimed is:

1. A process for preparing graphene nanoribbons, which comprises:
   (a) providing at least one aromatic monomer compound which is selected from at least one polycyclic aromatic monomer compound, at least one oligo phenylene aromatic monomer compound, or combinations thereof, on a solid substrate,
   (b) polymerization of the aromatic monomer compound so as to form at least one polymer on the surface of the solid substrate, and
   (c) at least partially cyclohydrogenating the at least one polymer of said (b) polymerization,
   wherein at least said (b) polymerization is carried out at a total pressure p(total) of at least $1\times10^{-9}$ mbar; and a partial oxygen pressure p(O$_2$) and partial water pressure p(H$_2$O) which satisfy the following relation:

$2.5\times10^{-19}$ mbar$^2 \leq p(O_2)\times p(H_2O) \leq 3\times10^{-14}$ mbar$^2$.

2. The process according to claim 1, further comprising treating a surface of a substrate prior to said polymerization to clean the substrate surface, wherein said treating is carried out at a total pressure p(total) of at least $1\times10^{-9}$ mbar.

3. The process according to claim 1, wherein at least said (b) polymerization is carried out at a partial oxygen pressure p(O$_2$) and a partial water pressure p(H$_2$O) which satisfy the following relation:

$2.59\times10^{-19}$ mbar$^2 \leq p(O_2)\times p(H_2O) \leq 2.76\times10^{-14}$ mbar$^2$.

4. The process according to claim 1, wherein at least one of said (a) providing and said (c) at least partially cyclohydrogenating is carried out at a total pressure p(total) of at least $1\times10^{-9}$ mbar; and optionally a partial oxygen pressure p(O$_2$) and partial water pressure p(H$_2$O) which satisfy the following relation:

$2.59\times10^{-19}$ mbar$^2 \leq p(O_2)\times p(H_2O) \leq 2.76\times10^{-14}$ mbar$^2$.

5. The process according to claim 1, wherein the total pressure p(total) in at least one of said (a) providing, said (b) polymerization, and said (c) at least partially cyclohydrogenating is within the range of from $1\times10^{-9}$ mbar to $1\times10^{-3}$ mbar.

6. The process according to claim 1, wherein the partial oxygen pressure p(O$_2$) and the partial water pressure p(H$_2$O) in at least one of said (b) polymerization and said (c) at least partially cyclohydrogenating satisfy the following relation:

$2.5\times10^{-19}$ mbar$^2 \leq p(O_2)\times p(H_2O) \leq 3\times10^{-15}$ mbar$^2$.

7. The process according to claim 2, wherein the total pressure p(total) during said treating is within the range of from $1\times10^{-9}$ mbar to $1\times10^{-3}$ mbar.

8. The process according to claim 2, wherein said treating is carried out by at least one of ion sputtering, plasma cleaning, thermal annealing, thin layer deposition of the substrate surface material, and cleavage of the substrate.

9. The process according to claim 2, wherein
   said (a) providing is carried out immediately and directly after said treating).

10. The process according to claim 1, wherein the process is carried out in a vacuum chamber.

11. The process according to claim 1, wherein at least said (b) polymerization is carried out at a total pressure p(total) of at least $1\times10^{-8}$ mbar.

12. The process according to claim 1, wherein at least said (b) polymerization is carried out at a total pressure p(total) of from $1\times10^{-8}$ mbar to $1\times10^{-5}$ mbar.

13. The process according to claim 1, wherein said polymer obtained from said (b) polymerization is a linear polymer.

14. The process according to claim 1, wherein said polymer obtained from said (b) polymerization is a linear graphene nanoribbon.

* * * * *